July 1, 1930.                G. SAGUE                1,769,039
DETECTOR
Filed Oct. 24, 1927          2 Sheets-Sheet 1

INVENTOR
George Sague
BY John J. Thompson
ATTORNEY

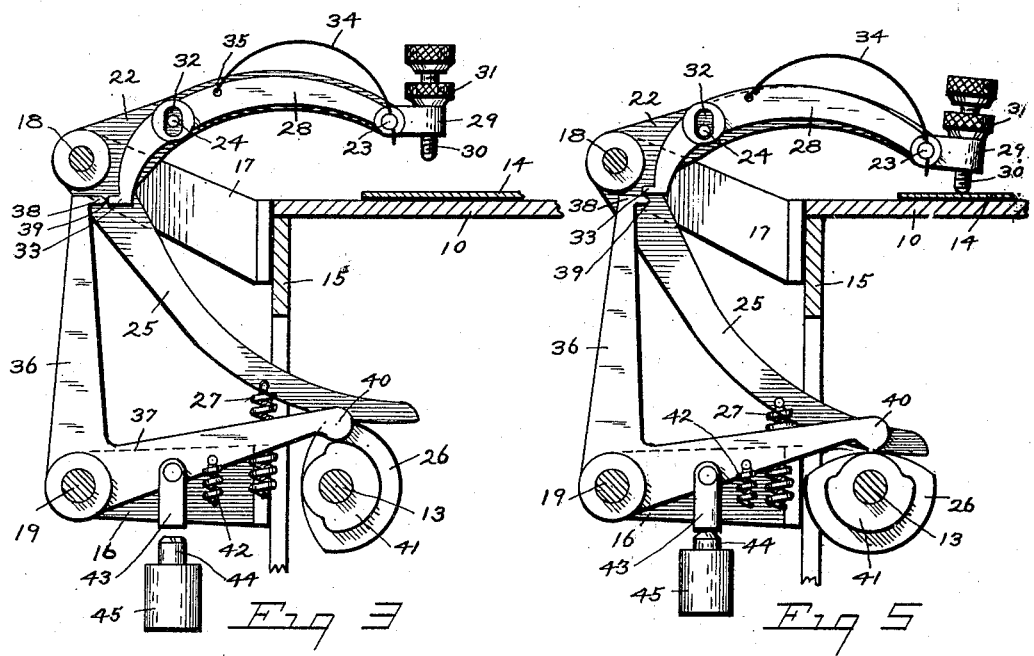
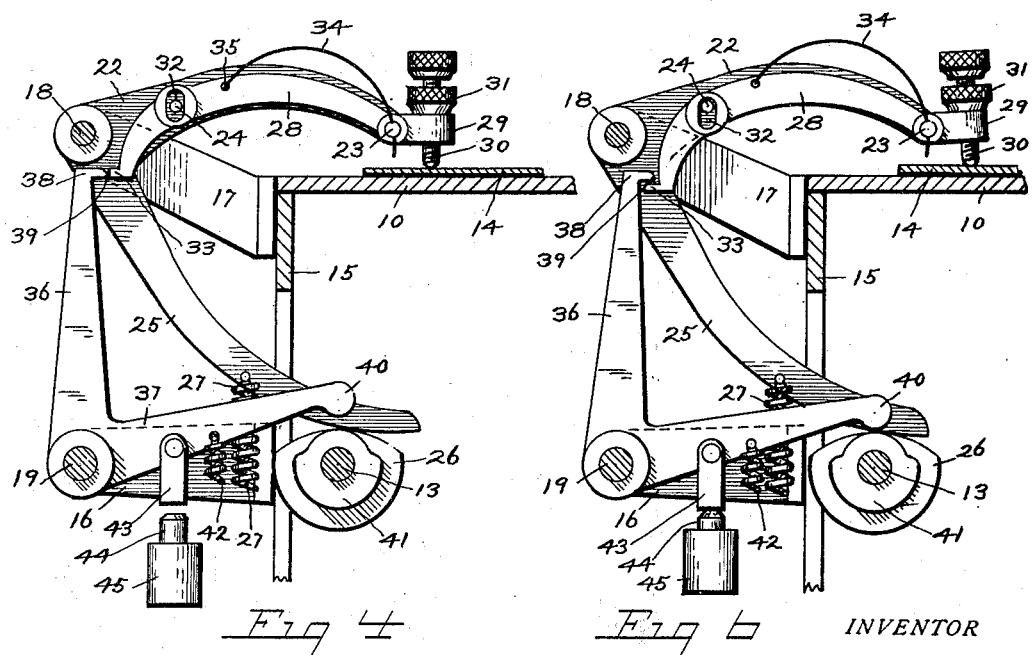

Patented July 1, 1930

1,769,039

UNITED STATES PATENT OFFICE

GEORGE SAGUE, OF OAKES, NEW YORK, ASSIGNOR TO GEORGE SAGUE MFG. CORP., A CORPORATION OF NEW YORK

DETECTOR

Application filed October 24, 1927. Serial No. 228,379.

This invention relates to a device for detecting or measuring the thickness of envelopes into which matter has been inserted, or matter which has been collected for distribution, to determine if the contents or amount is correct; that is if there are all of a predetermined quantity in the envelope or bunch, and also if too many have been collected.

The device may also be employed to measure the thickness of any one or number of flat articles, and is not confined to mail matter, but may have many uses.

While the device is primarily intended as an attachment for or to be incorporated into inserting and mailing machines for measuring the thickness of the filled envelopes or other containers before sealing and stamping to determine and detect any that do not contain the required amount of matter, and operate to at once stop the machine so that the error may be corrected, the device can be made in the form of a self contained machine and have the envelopes or other matter to be measured fed thereto by hand if desired.

In the operation of mailing and inserting machines where a number of inserts or other matter to be mailed is collected together and inserted into an envelope or wrapper, it is very important to be sure that each envelope or wrapper receives the correct number of inserts, and not over or under the predetermined number, and this should be detected before the envelope is sealed and stamped, and the machine stopped so that the mistake can be corrected at once, as it would be difficult to find the defective envelope after the same had been stacked after sealing and stamping.

The device is very simple, and yet may be adjusted to detect a very slight variation in the thickness of the filled envelope or other article to be measured, and is capable of positive action at all times.

The object of the invention is to provide means for detecting any defects in the filling of mail matter, or the like and to at once indicate or stop the operation of the machine when such a mistake occurs.

Another object being to detect any error or miss in the feeding or travel of the envelopes or wrappers through the machine.

In the drawings:

Figure 3 is a detail side view of the device, showing the same in a normal raised position.

Figure 4 shows the same in position for measuring a correctly filled envelope.

Figure 5 shows the same in position for measuring an envelope containing too few inserts.

Figure 6 shows the same in position for measuring an envelope containing too many inserts.

Referring to the drawings:—

Figure 1:
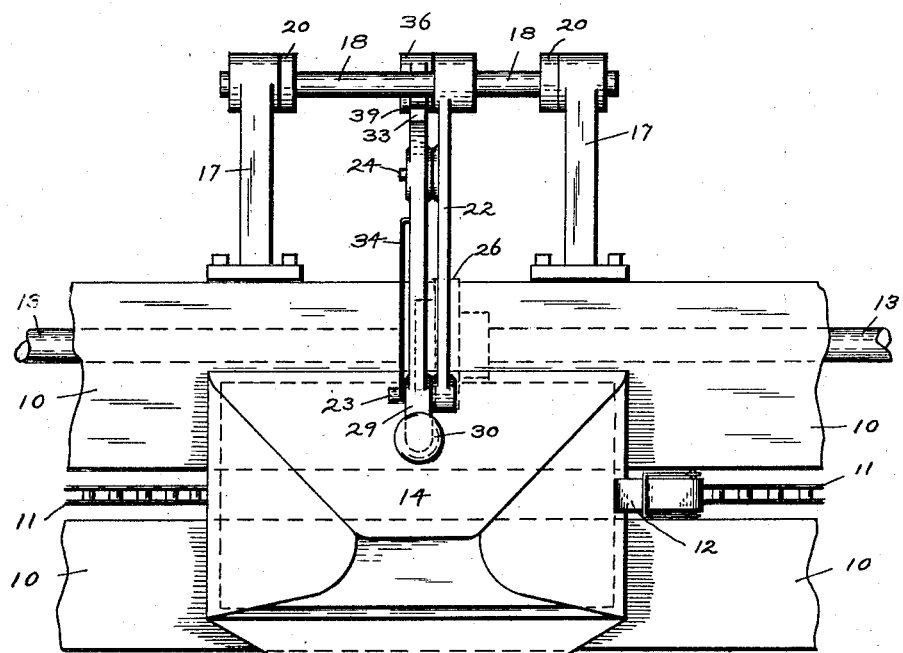
Figure 1 shows a top plan view of a portion of a mailing machine, to which the device has been attached.
Figure 2:
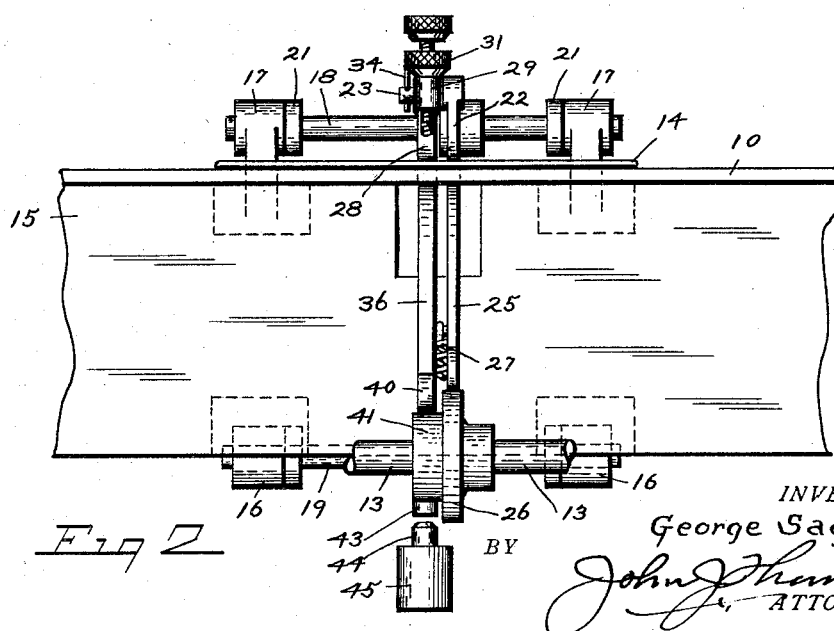
Figure 2 is a front elevation of the same.

Part of a mailing machine is shown, and comprises the divided table or supporting surface 10, the envelope conveying means 11, supplied with the envelope grippers 12; and a shaft 13 designed to be rotated by some suitable means and timed with the travel of the envelope 14 through the machine, to make the detector device function once each time an envelope passes it or is due to pass under its detecting arm.

To the frame 15 of the mailing machine is attached the bearing brackets 16 and 17, within which are mounted the rocker shafts 18 and 19, which are retained in place by the collars 20 and 21.

On the shaft 18 is secured an arm 22, which is provided near its outer end with a transverse stud 23, and near its inner end with a pin 24; while integral with said arm 22 and depending therefrom is an arm or lever 25, which is in contact with a cam 26 which is mounted on the shaft 13; said lever 25 being held in contact with said cam 26 by the action of the spring 27, one end of which is attached to said lever 25 and the other end to some suitable place on the machine.

Pivoted on the stud 23 is a curved detector arm 28, which is formed with the projecting end 29, threaded to take a threaded contact screw 30, which is provided with a jaw nut 31; while near the rear end of said arm 28 there is provided a slot or elongated transverse hole 32 which embraces the limit pin 24; and the rear end of said arm 28 is formed with a foot 33; and said arm is also provided with a spring 34, one end of which is hooked and enters a hole 35 in said arm, and the other end is held in a transverse hole in the stud 23, and also serves to retain the arm 28 on said stud 23, and hold the rear end of said arm 28 raised when the contact screw 30 is free to descend.

For providing a latch to be operated by said arm 28 there is mounted on the shaft 19 a bell crank comprising the two arms 36 and 37; the arm 36 being formed with a hooked end 38 formed with a knife edge 39; and the other arm 37 having a rounded end 40 in contact with a cam 41 on the shaft 13; said contact being maintained by the spring 42 having one end secured to the arm 37 and the other end to some suitable part of the machine.

The lower arm 37 is provided with a depending plunger 43 or other suitable device, which is designed to coact with the button 44 of an electric switch 45 which controls the current for operating the machine, so that when the plunger 43 strikes and pushes down on the button 44 the current will be cut off and the machine will come to a stop.

Having described the details of construction, the operation of the device is as follows; the rotation of the shaft 13 through the shape of the cam 26 will impart to the arm 22 a reciprocating movement and to the contact screw 30 an approximately vertical movement; and as the two cams 26 and 41 are both secured on the same shaft 13, the arms 36 and 37 will be given a rocking movement, and by the position of the cams the foot 33 on the arm 28 will abut the edge 39 of the arm 36 and the two will be held in the position shown in Figure 3, with the plunger out of contact with the button 44.

Now referring to Figure 4, and assuming that the envelope and contents are of the required thickness; by the action of the cams the contact screw is lowered into contact with said envelope, and the latch remains in the same position as in Figure 3 as the arm 28 has not been moved on the stud 23 and the foot and edge remain abutting, but it will be noted that the arm 37 is not in contact with the cam 41.

Now referring to Figure 5, and assuming that the envelope does not contain the required amount of matter, the contact screw 30 when it comes into contact with the envelope will be slightly lower than in Figure 4, thus moving the arm 28 on its pivot point and raising the foot 33 so that the edge 39 will pass under the foot 33 allowing the arm 37 and the end 40 to contact with the lowest part of the cam 41, and the plunger to come into contact and press on the button 44 to cut off the current and stop the machine.

Now assuming that the envelope contains too many inserts as indicated in Figure 6, when the contact screw 30 comes into contact with the envelope, the end of the arm 28 will be slightly raised and by the action of the pivot will depress the rear end of said arm 28, allowing the edge 39 to pass above the foot 33; and the end 40 of the lever 37 to contact with the cam 41 and the button 44 to be pressed, cutting off the current and stopping the machine.

It will thus be seen that as the arm 22 carrying the detector arm 28 is brought down as each successive envelope is brought into position to be measured or gaged, that if the contents of said envelope is correct that the latch will remain in a locked position with the foot and no pressure will be exerted on the switch button, but if there are too many or not enough inserts in the envelope, the latch and the foot will become disengaged and the latch will by its lowered position operate to press the switch button.

The contact screw 30 may be graduated in any desired manner to show the thickness of the envelope desired, so that the device may be set the same each time, or variations noted.

Having thus described my invention, what I claim as new and desire to secure by Letters Patent, is:

A detector for mailing machines or the like, and in combination with mechanism for stopping said machine, means for measuring the thickness of the matter to be mailed, comprising a swinging arm and means for operating the same, a detector arm carried thereby, an adjustable contact measuring means carried by said detector arm, a latch mounted adjacent to said swinging arm, means for operating the same, means carried by said latch for operating the stopping mechanism of the machine, and coacting means between said latch and said detector arm for rendering the stopping means inactive when the matter to be mailed is of a predetermined thickness.

In testimony whereof I hereunto affix my signature.

GEORGE SAGUE.